US005717257A

United States Patent [19]

Hofsäss

[11] Patent Number: 5,717,257

[45] Date of Patent: Feb. 10, 1998

[54] THERMAL SWITCH FOR ELECTRICAL LOAD

[76] Inventor: Marcel Hofsäss, Bodelschwinghstr., 36, D-75179 Pforzheim, Germany

[21] Appl. No.: 604,524

[22] Filed: Feb. 21, 1996

[30] Foreign Application Priority Data

Feb. 23, 1995 [DE] Germany ........................ 195 06 342.2
Dec. 9, 1995 [DE] Germany ........................ 195 45 996.2

[51] Int. Cl.[6] ........................ H02H 7/085

[52] U.S. Cl. ........................ 307/117; 307/116; 318/471; 318/783; 361/24; 361/37; 361/124; 374/132

[58] Field of Search ........................ 307/117, 116; 318/783, 471; 361/24, 37, 99, 105, 124; 374/132

[56] References Cited

U.S. PATENT DOCUMENTS

| | | | |
|---|---|---|---|
| 3,659,242 | 4/1972 | Hoagland | 337/139 |
| 3,965,387 | 6/1976 | Stuart et al. | 315/47 |
| 4,389,692 | 6/1983 | Sander et al. | 361/29 |
| 4,396,898 | 8/1983 | Tibolla . | |
| 4,656,378 | 4/1987 | Atherton et al. . | |
| 5,066,878 | 11/1991 | Sekine et al. . | |
| 5,126,510 | 6/1992 | Bauer et al. | 174/52.1 |
| 5,323,287 | 6/1994 | Peter | 361/24 |

FOREIGN PATENT DOCUMENTS

| | | |
|---|---|---|
| 42 43 845 A1 | 6/1994 | Germany . |
| 1 272 775 | 5/1972 | United Kingdom . |
| 2 222 730 | 3/1990 | United Kingdom . |

*Primary Examiner*—William M. Shoop, Jr.
*Assistant Examiner*—Albert W. Paladini
*Attorney, Agent, or Firm*—Harness, Dickey & Pierce, P.L.C.

[57] ABSTRACT

An electrical load, such as a motor, has a first and a second terminal element for supplying electricity to the load. The second terminal element is directly connected to the load whereas the first terminal element together with a further terminal element forms a clamping socket for a switching device. The further terminal element is electrically connected to the load. When the switching device is inserted into the seat, the first terminal element is connected to the load in series with the further terminal element via the switching device.

17 Claims, 4 Drawing Sheets

THERMAL SWITCH FOR ELECTRICAL LOAD

BACKGROUND OF THE INVENTION

The present invention relates to an electrical load(s), for example a motor, transformer, heating spiral, etc., with a first and second terminal element to supply electricity to the load(s).

RELATED PRIOR ART

Such load(s) are generally known from the state of the art. An increasing number of devices, particularly household devices, have electrical load(s), for example pumps in washing machines, motors for compressors in refrigerators and deep freezers, transformers for electrical equipment which are operated at a different voltage to the mains voltage, fan motors and heating spirals in hair dryers, etc.

There is an increasing trend to monitor the temperature development of the load(s) for safety reasons, whereby the load(s) is switched off in the event of overheating. Temperature-dependent switches that are also called "temperature controllers" which have their own housing or supporting part and which are subsequently mounted on the load(s) are used in such cases. These controller housings have bimetallic swtiching devices which are generally linked to two terminal lugs, connectors or pigtails, which themselves rest on the controller housing. Such a terminal element in the temperature controller is connected to a corresponding terminal element in the load(s) whereby the second terminal element in the temperature controller and the second terminal element in the load(s) are used to supply electricity to the load(s), which is thus connected in series with the temperature controller.

It is common to provide these switching devices with a two-part, conductive housing containing a bimetallic snap switch and a spring disk. The spring disk bears a contact which rests against the cover so that there is a conductive link between the cover and base of the switching device via the contact and spring disk when the temperature is low enough. If the temperature of the switching device increases the bimetallic snap switch "snaps" over, moving the spring disk so that the electric link between the cover and base is interrupted. If there is consequently a thermally conductive link between the switching device and the part of the load(s) whose temperature development is to be monitored, the bimetallic snap switch can be adjusted so that the flow of current through the bimetallic switch, which is connected in series with the load(s), is interrupted when the load(s) reaches a pre-set temperature.

Apart from this temperature monitoring, temperature controllers also often have other functions, they protect the load(s) against excessive current consumption and/or prevent a restoration of power to the load(s) when its temperature has dropped, whereby the temperature controllers are of a self-locking or holding design. In order to fulfil these additional functions, parallel and protective resistors are integrated in the temperature controller.

Such temperature controllers are generally mounted on the load(s) to be monitored during the last stage of production. Great care must hereby be taken to ensure a good thermoconducting contact with that part of the load(s) whose temperature development has to be monitored.

Moreover, it must also be remembered that electrical load(s) often have standardised terminal patterns so that they can be supplied with electricity via standardised plugs. In this connection, DE 38 17 080 C1 mentions designing the housing of a temperature controller in such a way that it can be plugged onto the terminals of the load(s) to be monitored, whereby two terminals protrude from the housing of the temperature controller which correspond to the desired terminal pattern. This greatly facilitates final assembly of the load(s) since a temperature controller only has to be plugged onto the load(s) terminals. The terminal pattern of the load(s) can either be retained or adapted to a different standard.

Such temperature controllers are relatively cost-intensive components on account of the necessary connection technology which connects the switching device inside the controller housing to its terminals, particularly since this technology generally involves manual work.

Furthermore, such temperature controllers are usually special developments which have to be adapted to the load(s) which is to be protected. Special attention must be paid here not only to the connection technology but also to a good thermal contact with the load(s) to be monitored. This also leads to high costs in the construction and assembly of such temperature controllers. These costs are logically reflected in the end costs of the load(s) protected by the temperature controller.

A further high cost factor is the assembly of the temperature controller on the load(s) to be monitored wherever the plug-type technology explained above is not used. Pigtails often have to be soldered or inserted into terminal blocks during assembly and this also requires wage-intensive manual work.

SUMMARY OF THE INVENTION

In view of the above it is an object of the present invention to reduce the manufacturing costs for an electrical load(s) of the kind mentioned at the outset through constructive measures.

In the case of the electrical load(s) mentioned at the outset, this object is achieved by the invention inasmuch as the load(s) has a seat for a temperature-dependent switching device, the second terminal element has a direct electrical connection with the load(s) and the first terminal element via a switching device when this is in the seat.

The object underlying the invention is fully achieved in this manner. It was surprisingly discovered that the manufacturing costs of the electrical load(s) to be monitored can be significantly reduced by simple constructive changes to the load(s) itself and not—as was previously the case—through further improvements to the temperature controller. The fundamental idea is to design a seat for the temperature-dependent switching device directly on the electrical load(s), whereby one terminal element has a direct electrical connection with the load(s) and the other via the switching device when this is located in the seat. In other words, the load(s) is already "pre-wired" so that the temperature-dependent switching device then only has to be located in the seat to complete the final connection technology for both the terminal elements and for the temperature-dependent switching device on the load(s) to be protected.

It is hereby preferred if the first terminal element is assigned a further terminal element which is electrically connected to the load(s) to supply the electricity and which together with at least a part of the first terminal element forms the seat for the temperature-dependent switching device so that when the switching device is located in the seat the first terminal element is connected in series with the further terminal element via the switching device.

This measure has constructive advantages. In addition to the first terminal element there is namely only one further terminal element on the load(s) to which the load(s) is electrically connected on the inside. This further terminal element can be manufactured together with the first and second terminal element with no great changes to the tools. Electrical load(s) normally have housing or supporting parts made of plastic in which the terminal elements are cast or injected as terminal lugs or connectors. In this case the injection moulding tool only has to be changed so that a further terminal element can be provided. The further terminal element is now electrically connected to the load(s) in place of the first terminal element so that no further manufacturing steps are required here compared to the state-of-the-art.

Alternatively it is preferred if the first terminal element is assigned a further terminal element which is electrically connected to the load(s) to supply the electricity and which together with a contact part electrically connected to the first terminal element forms the seat for the temperature-dependent switching device so that when the switching device is located in the seat the first terminal element is connected in series with the further terminal element via the switching device.

Unlike the first embodiment, it is not the first terminal element itself which hereby forms the seat for the temperature-dependent switching device but a contact part electrically connected with the first terminal element together with the further terminal element. This embodiment is preferred when for constructive or other reasons it is necessary to separate the two terminal elements from the seat for the temperature-dependent switching device.

Following final assembly of the load(s) a switching device is then inserted into the seat provided for this purpose to create a series connection of the first terminal element, switching device, further terminal element and load(s).

Since no complete temperature controllers are used here but only the switching devices, the material costs for the temperature switch share can be significantly reduced since bespoke temperature controllers can only be manufactured at much higher costs compared to the switching devices on account of the connection technology necessary for the temperature controllers.

The planned reduction of the manufacturing costs is thus achieved on the one hand by the very simple mounting of the switching device on the ready-made load(s) and on the other through the greatly reduced material costs of the temperature switch. The additional costs of the further terminal element are negligible compared to the cost savings mentioned.

All that is necessary is an electrical connection of the switching device in the seat with the first terminal element or the contact part connected to this on the one side and with the further terminal element on the other. This electrical connection can be achieved for example through soldering or pinching between screw connections.

In a further embodiment it is then preferred if the further terminal element is a clamping element which forms a clamping socket for a switching device together with the first terminal element.

On the other hand it is preferred if the further terminal element is a contact part which forms a clamping socket for a switching device together with the contact part connected to the first terminal element.

The advantage of this is that the costs of mounting the switching device on the load(s) can be further reduced; if the clamping socket is designed accordingly the switching device only has to be pushed into this and is automatically held in place. Since it is clamped by the two contact parts or the first an second terminal element this clamping also creates the electric series circuit so that no further manufacturing steps are required.

On the whole it is preferred if the first and second terminal element preferably have a standardised terminal pattern.

This in itself familiar measure is advantageous inasmuch as the further assembly of the load(s) is simple and thus economical with a standardised terminal pattern.

In a further embodiment it is preferred if there is a thermoconducting contact between the further terminal element and that part of the load(s) whose heat development is to be monitored.

The advantage of this is that no further components are required to provide a thermoconducting contact between the switching device and the load(s). Moreover, the further terminal element itself can be designed as a thermoconducting bridge. If the switching device only has to protect against excess currents such a thermoconducting connection is not necessary. Moreover, the switching device may already be located at a point on the load(s) where the heat which is to be monitored is produced so that a further thermoconducting link is unnecessary.

It is hereby preferred if an encapsulated switching device is inserted into the seat where the electrical connection is made by a cover and a base part isolated from the cover which rest against the first and second terminal elements or the two contact parts.

This simple constructional measure facilitates the mounting of the switching device on the load(s) in connection with its design as a clamping socket. Since such switching devices are standard components they are very inexpensive and also have the advantage that they can now be easily mounted on the load(s). During the development of new automatic manufacturing machines it is even possible to have the load(s) automatically fitted with the switching devices, thus further reducing manufacturing costs. In addition, the same switching devices can be used for a number of different load(s), specially made temperature controllers are no longer required.

It is further preferred if the load(s) has a housing or connecting part onto which the terminal elements are fastened, preferably cast.

This reduces the actual manufacturing costs of the load(s), the terminal elements only have to be cast during the manufacture of the housing or connecting part, which would in any case be necessary.

In a further embodiment it is preferred if the further terminal element and the first terminal element or the two contact parts are arranged at least in part in a recess in the housing or connecting part which in turn forms a receiving space for the switching device.

The advantage of this is that the switching device can be protected against external influences so that no additional protective caps, etc. are necessary, which again has a positive effect on the manufacturing costs. Moreover, the receiving space can be located directly alongside the part whose heat development is to be monitored, thus doing away with additional thermoconducting bridges.

It is generally preferred if the load(s) is assigned a protective element which in a fitted state protects the seat and switching device therein against external influences.

The switching device and additional terminal element often require insulation and/or mechanical protection. If the actual load(s) cannot be redesigned in this connection, the least expensive method is an additional protective element.

It is hereby advantageous if the protective element is a cover to close the receiving space.

The combination of receiving space and protective element in the form of a cover leads in particular to further manufacturing advantages since, following an automatic fitting of the switching device in the receiving space, the cover can be automatically fitted using automatic manufacturing machines.

On the other hand it is preferred if the protective element is a protective cap which can be fitted over the first and second terminal element, whereby the first terminal element protrudes through the protective cap.

This simple constructional modification means that load (s) with only one further terminal element in addition to the first which have been subsequently converted to clamp a switching device can be manufactured whereby the protective cap ensures the necessary electrical and/or mechanical protection for the switching device and other terminal elements.

It is generally preferred if a load(s) is assigned a shorting plug which can be inserted into the seat in place of the switching device.

This measure once again significantly cuts the manufacturing costs of the load(s). The load(s) can be tested in the test station or during the output test without a switching device having been inserted into the seat. Should it be discovered that the load(s) does not display the required specifications it can be rejected without the simultaneously fitted switching device having to be rejected too. Although it would be possible to remove the switching device from the seat should it be discovered that the load(s) is defective, this requires additional manual work. The shorting plug on the other hand, which is very cheap to produce, can be rejected together with the load(s). The shorting plug can also be designed as a longer rod which is automatically removed from the load(s) when this leaves the test station. If the load(s) is to be provided with a switching device after the test station whatever the case, this automatic removal of the shorting plug is advantageous.

It is also generally preferred if the terminal elements comprise terminal lugs.

The advantage of this is that in the simplest of cases the terminal lug itself can be the part of the terminal element which makes contact with the switching device. In such a load(s) with terminal lug, therefore, only a second, possibly slightly shorter terminal lug has to be provided together with the existent first terminal lug, whereby these should be far enough apart to enable the switching device to be clamped between them. The load(s) thus no longer requires an internal connection to the first terminal lug but to the second.

It is further preferred if the terminal lug of the first terminal element and the terminal lug of the second terminal element are resilient parts and cast in a plastic part of the load(s) so that a switching device which is inserted between the lugs is elastically clamped.

In the embodiment with the two contact parts it is furthermore preferred if the contact parts are designed as terminal lugs whose broad ends face one another.

This measure also has the same constructive advantages as those discussed above in connection with the terminal lugs. Very economical and universally applicable terminal lugs can be used to make electrical contact with and mechanically hold the temperature-dependent switching device.

BRIEF DESCRIPTION OF THE DRAWINGS

Further advantages can be derived from the description and enclosed drawings.

It is understood that the aforementioned features and those to be explained in the following can be used not only in the specified combinations but also in other combinations or alone without going beyond the scope of the present invention.

Figure 1:
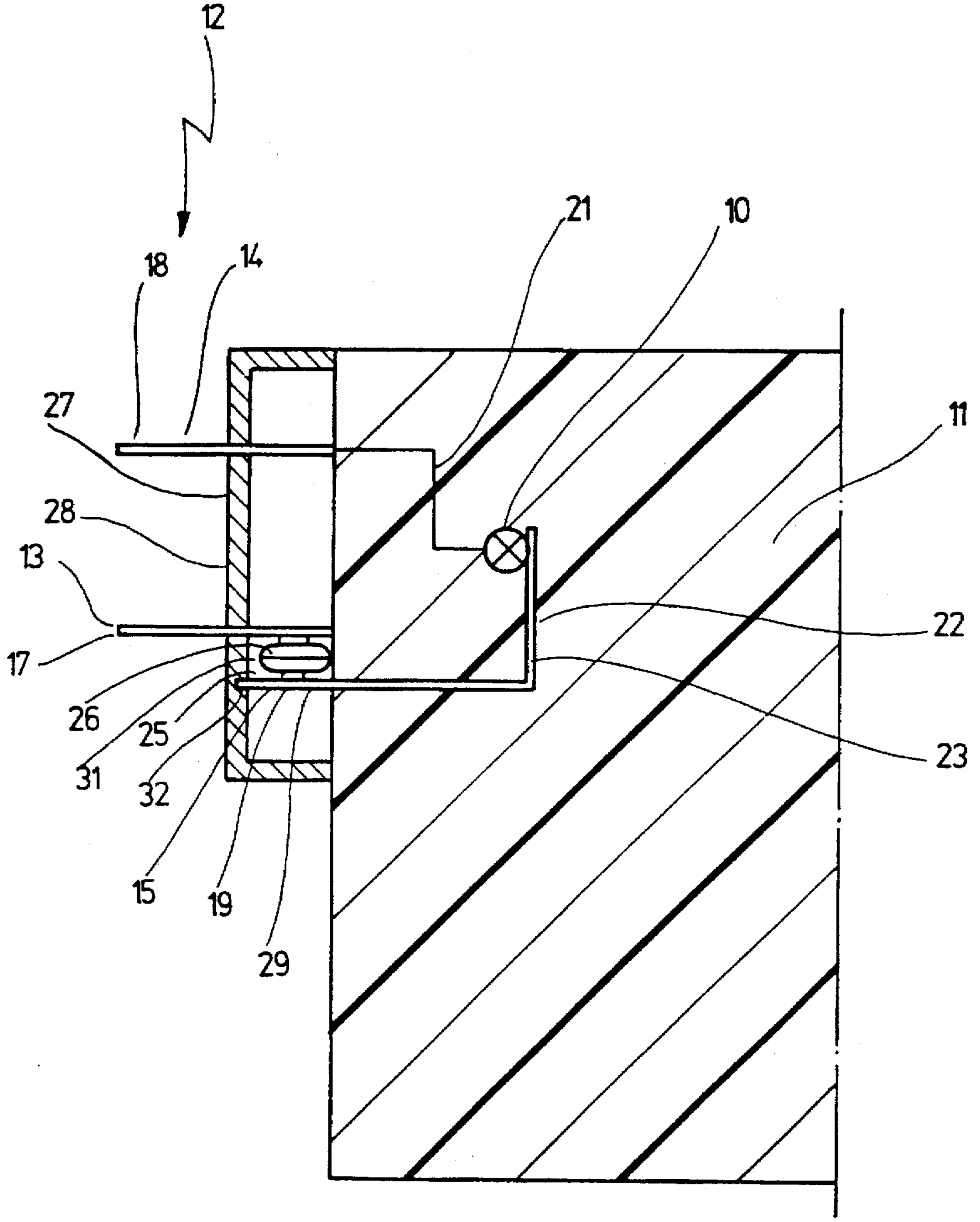
Figure 2:
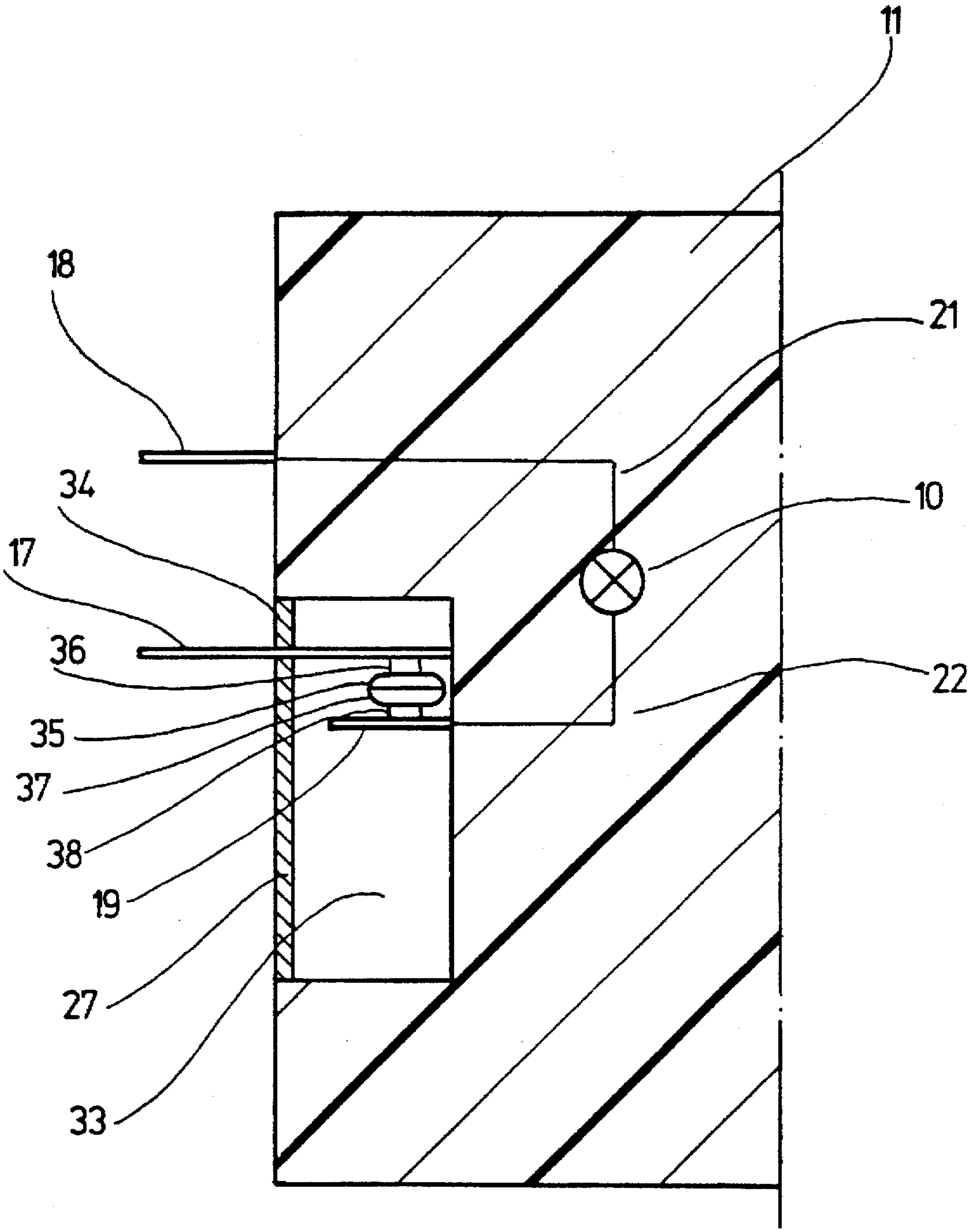
Figure 3:
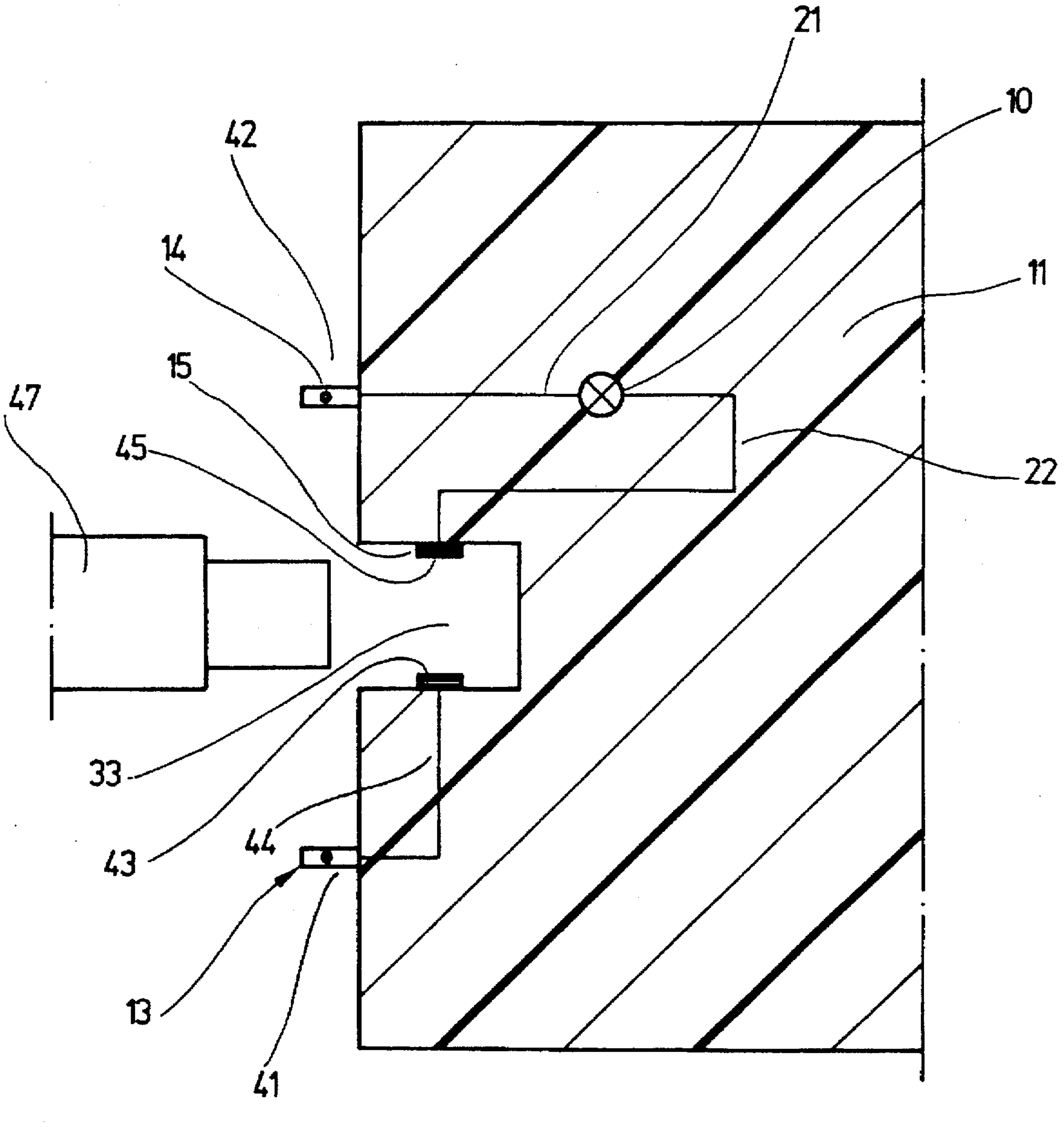
Figure 4:
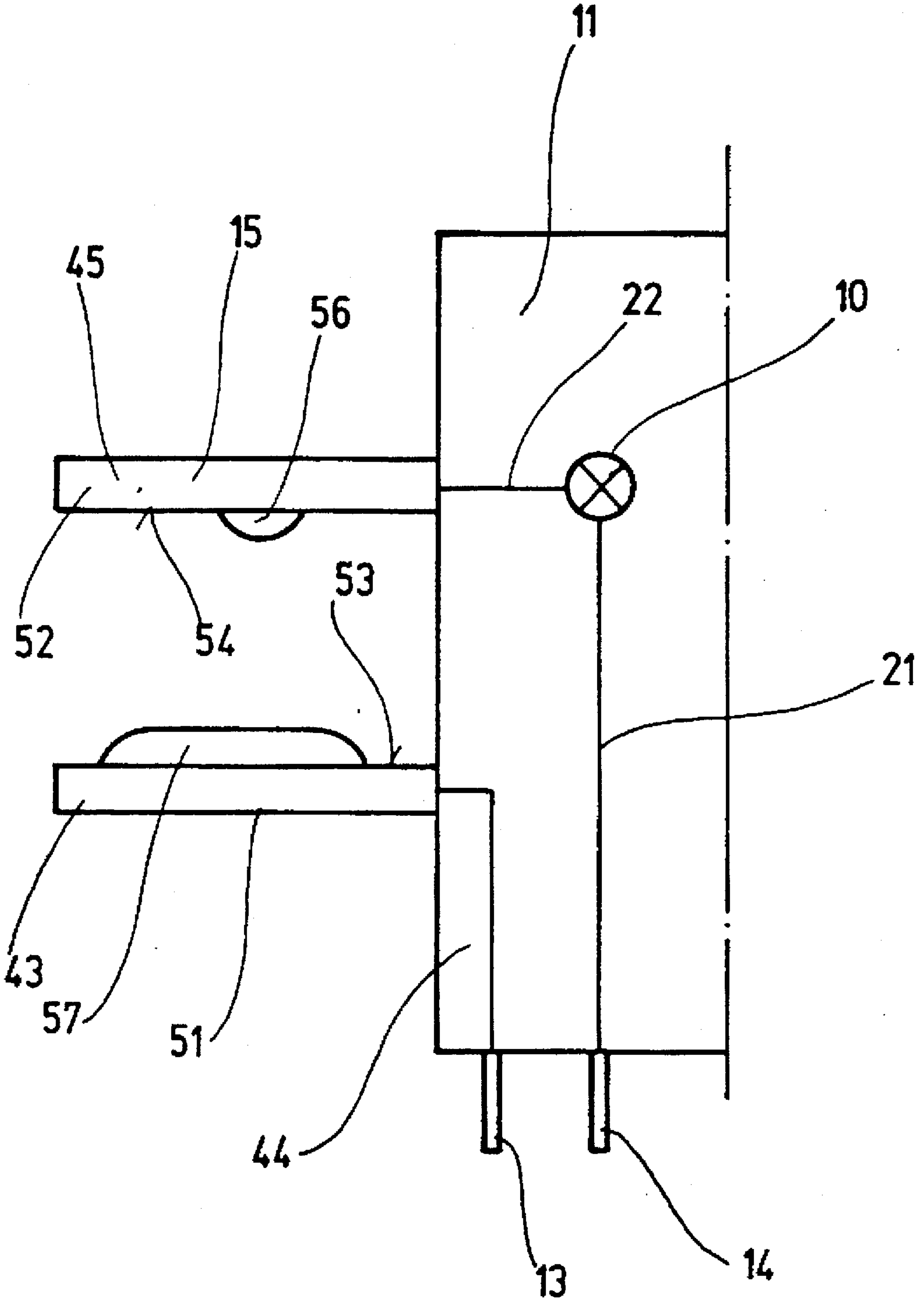

The invention is shown in the drawings and will be explained in more detail in the following. In the drawings:

FIG. 1 is a diagrammatic side view of the basic drawing of the new load(s) in which the switching device is protected by a protective cap;

FIG. 2 is a representation as in FIG. 1 in which the switching device is arranged in a recess in the housing;

FIG. 3 is a representation as in FIG. 2 in which the terminal element is designed as a terminal block and a shorting plug is shown diagrammatically; and FIG. 4 is a representation as in FIG. 3 with an embodiment in which two terminal lugs form the seat for the switching device.

DETAILED DESCRIPTION OF PREFERRED EMBODIMENTS

FIG. 1 diagrammatically shows a basic side view of an electrical load(s) 10 which can be, e.g. a motor, heating spiral, transformer or similar electrical device which has to be protected against overheating and/or excess current.

A housing or supporting part 11, only indicated in the diagram, is arranged on the load(s) 10 in a known manner on which terminals 12 for the supply of electricity to the load(s) are provided in a known manner. These terminals 12 comprise a first terminal element 13 and a second terminal element 14, which in turn display a standardised contact pattern in a known manner.

Moreover, a further terminal element 15 is provided alongside the first terminal element 13. In the embodiment shown the terminal elements 13, 14, 15 are each designed as terminal lugs 17, 18, 19 which are cast in the plastic housing or supporting part 11.

The second terminal lug 18 is connected to the load(s) 10 via a connector 21 whose other end is connected to the further terminal lug 19 via a further connector 22. The further connector 22 is designed as a thermoconducting bridge 23 so that the further terminal lug 19 is in thermal contact with a part of the load(s) 10 whose heat development is to be monitored.

The first terminal lug 17 and the further terminal lug 19 together form a seat 25 for a temperature-dependent switching device 26 which is only indicated in the diagram. This switching device 26 makes conductive contact between the first terminal lug 17, which is otherwise not connected to the load(s) 10, and the further terminal lug 19. In this way the load(s) 10 continues to be provided with electricity via the first and second terminal lugs 17, 18 though the switching device 26 is connected in series in this circuit.

The switching device 26 is a switching device such as is used in temperature controllers and has a bimetallic snap switch and spring disk as already explained at the outset. Within the permissible temperature range of the load(s) 10 the switching device 26 provides a conductive link between the first terminal lug 17 and the further terminal lug 19 so that the current can flow freely to the load(s) 10. If the load(s) 10 now heats up inadmissibly this rise in temperature is passed to the switching device 26 via the thermoconducting bridge 23 so that the switching device opens when a nominal temperature is exceeded, thus interrupting the power supply to the load(s) 10.

Apart from this temperature protection function the switching device 26 also includes a protective function against excess current, for which purpose the switching device 26 contains a series resistor. Moreover, the switching device 26 can be of a self-locking design through a parallel resistor so that even if the temperature of the load(s) drops the switching device 26 does not close, meaning that the load(s) 10 remains disconnected for safety reasons.

Since the switching device 26 carries the supply current for the load(s) 10 via its housing, as is already known from the state-of-the-art, it has to be electrically insulated on the outside for safety reasons. For this purpose a protective element 27 in the form of a protective cap 28 is provided which is placed over the terminal lugs 17, 18 and 19. It can be seen that the terminal lugs 17 and 18 protrude through openings in the protective cap 28 so that they remain accessible from outside for a standardised plug, for example.

At least the first terminal lug 17 and the further terminal lug 19 are resilient so that the seat 25 is a clamping seat 31 which holds the inserted switching device 26 by clamping. This means that once the switching device 26 has been inserted into the clamping seat 31 a safe mechanical fit or electrical connection through soldering or similar methods is no longer required.

This clamping of the switching device 26 in the clamping seat 31 is achieved on the one hand by the fact that the switching device 26 is inserted between the two terminal lugs 17 and 19 under an initial tension. Furthermore, there is a recess 32 on the inside of the protective cap 28 into which the further terminal lug 19 engages. This recess 32 is arranged in such a way that the first terminal lug 17 and second terminal lug 19 are pressed together towards the switching device 26, thus ensuring a firm fit of the switching device 26.

A known, state-of-the-art load(s) would only have the first and second terminal lugs 17 and 18, whereby the first terminal lug 17 is also directly connected to the load(s) 10. In order to arrive at the new load(s) 10, all that is required is to provide the further terminal lug 19 on the housing or supporting part 11 and to connect this to the load(s) 10 in place of the first terminal lug 17. This permits a simple and economical conversion of existing load(s) whereby the subsequent mounting of a temperature controller is greatly facilitated inasmuch as only the switching device from the temperature controller, which consists of a number of components, is clamped between the first terminal lug 17 and further terminal lug 19. Thus, on the one hand the material costs are reduced and on the other this permits a very simple and automated manufacture.

FIG. 2 shows an alternative embodiment for the housing or supporting part 11 which has a recess 33 in the housing or supporting part 11 which partly encloses the further terminal lug 19 and the first terminal lug 17. This recess 33 thus forms a receiving space for the switching device 26, which is thus better protected against mechanical damage. In order to complete the electrical insulation, the protective element 27 is now designed as a simple protective cap 34 which can be automatically placed onto the seat 25 once the switching device 26 has been inserted, whereby the first terminal lug 17 protrudes through this protective cap 34 and is accessible on the outside for further connections.

FIG. 2 also shows that the switching device 26 consists of a cover part 35 with an external contact 36 and a base part 37 opposite the cover part 35 with a further external contact. The switching device 26 has an electrical and mechanical connection to the first terminal lug 17 and the further terminal lug 19 via the contacts 36, 38.

FIG. 3 shows an embodiment similar to the example in FIG. 2 whereby the first terminal element 13 comprises a clamping block 41 and the second terminal element 14 a clamping block 42. The first terminal element 13 furthermore comprises a contact part 43 which is connected to the clamping block 41 via an electrical connection 44. This contact part 43 is located in the recess 33, on the opposite side of which there is a further contact part 45 as a further terminal element 45. A switching device 26 can now be inserted between these two contact parts 43, 45.

On account of the electrical connection 22, 44 on both sides it is now possible to locate the seat for the switching device 26 separate from the external terminal elements 13, 14.

In FIG. 3, a shorting plug is shown at 47 which can be inserted into the recess 33 in place of a switching device 26. The object of this shorting plug 47 is to replace the switching device 26 if the load(s) 10 is to be operated without monitoring by such a switching device 26. This may be the case either if such a monitoring is unnecessary or if the function of the load(s) 10 itself is to be tested before insertion of the switching device 26 in a test station or during quality control. Following a successful test the shorting plug 47 can either be removed or remain in the recess 33 if the device is to be delivered without a switching device 26.

FIG. 4 shows a further embodiment in which the housing or supporting part 11 has two terminal lugs 51, 52 which form the contact parts 43, 45. The broad faces 53, 54 of the terminal lugs 51, 52 face each other so that a switching device 26 can be clamped between them. The terminal lug 52 has a catch 56 and the terminal lug 51 a counterpart 57 to lock the switching device in place. The catch 56 and counterpart 57 can engage in corresponding recesses in the switching device 26 so that this is held resiliently without being lost between the terminal lugs 51 and 52.

The terminal elements 13 and 14 are still provided on the housing or supporting part 11, of which the terminal element 14 is directly connected to the electrical load(s) 10 whereas the terminal element 13 is connected to the contact part 43. The load(s) is still connected to the further terminal element 15, in this case the terminal lug 52, via the connection 22.

As in the embodiment shown in FIG. 3, the terminal elements 13, 14 are located at a distance from the seat, formed in this case by the two terminal lugs 51 and 52. The switching device 26 itself is not shown in FIG. 4 for reasons of clarity.

Of course, a protective cap comparable to the protective cap 28 shown in FIG. 1 can also be placed over the terminal lugs 51, 52.

What I claim is:

1. A thermally protected electrical load, said load comprising:

a first and second terminal element provided to supply electricity to the load; and a seat for a temperature-dependent switching device, said second terminal element being directly electrically connected to the load, and the first terminal element being assigned a further terminal element which is electrically connected to the load to supply the electricity and which together with at least a part of the first terminal element forms the seat for the temperature-dependent switching device so that when the switching device is located in the seat the first terminal element is connected to the load in series with the further terminal element via the switching device, whereby the further terminal element is a clamping element which together with the first terminal element forms a clamping socket to clamp the switching device.

2. The load in accordance with claim 1, characterized in that the first and second terminal element have a standardised terminal pattern.

3. The load in accordance with claim 1, characterized in that the further terminal element is in thermally conductive contact with a part of the load whose heat development is to be monitored.

4. The load in accordance with claim 1, characterized in that an encapsulated switching device is inserted into the seat where the electrical connection is made by a cover and an base part isolated from this which rest against the first and further terminal elements.

5. The load in accordance with claim 1, characterized in that it has a housing or connecting part onto which the terminal elements are fastened, preferably cast.

6. The load in accordance with claim 5, characterized in that the further terminal element and the first terminal element are arranged at least in part in a recess in the housing or connecting part which in turn forms a receiving space for the switching device.

7. The load in accordance with claim 1, characterized in that it is assigned a protective element which in a fitted state protects the seat and switching device therein against external influences.

8. The load in accordance with claim 7, characterized in that the protective element is a cover to close the receiving space.

9. The load in accordance with claim 6, characterized in that the protective element is a cover to close the receiving space.

10. The load in accordance with claim 7, characterized in that the protective element is a protective cap which can be fitted at least over the first and further terminal element, whereby the first terminal element protrudes through the protective cap.

11. The load in accordance with claim 1, characterized in that it is assigned a shorting plug which can be inserted into the seat in place of a switching device.

12. The load in accordance with claim 1, characterized in that the terminal elements comprise terminal lugs.

13. The load in accordance with claim 12, characterized in that the terminal lug of the first terminal element and the terminal lug of the further terminal element are spring mounted and cast in a plastic part of the load so that a switching device which is inserted between the lugs is elastically clamped.

14. The load in accordance with claim 1 characterized in that the two contact parts are arranged at least in part in a recess in the housing or connecting part which in turn forms a receiving space for the switching device.

15. A thermally protected electrical load, said load comprising:

a first and second terminal element provided to supply electricity to the load; and a seat for a temperature-dependent switching device, said second terminal element being directly electrically connected to the load, and the first terminal element being assigned a further terminal element which is electrically connected to the load to supply the electricity and which together with a first contact part electrically connected to the first terminal element forms the seat for the temperature-dependent switching device so that when the switching device is located in the seat the first terminal element is connected to the load in series with the further terminal element via the switching device, whereby the further terminal element is a contact part which together with the first contact part forms a clamping socket to clamp the switching device.

16. The load in accordance with claim 15, characterized in that the contact parts are designed as terminal lugs whose broad ends face one another.

17. The load in accordance with claim 15, characterized in that an encapsulated switching device is inserted into the seat where the electrical connection is made by a cover and an base part isolated from this which rest against the two contact parts.

* * * * *